United States Patent Office 3,314,862
Patented Apr. 18, 1967

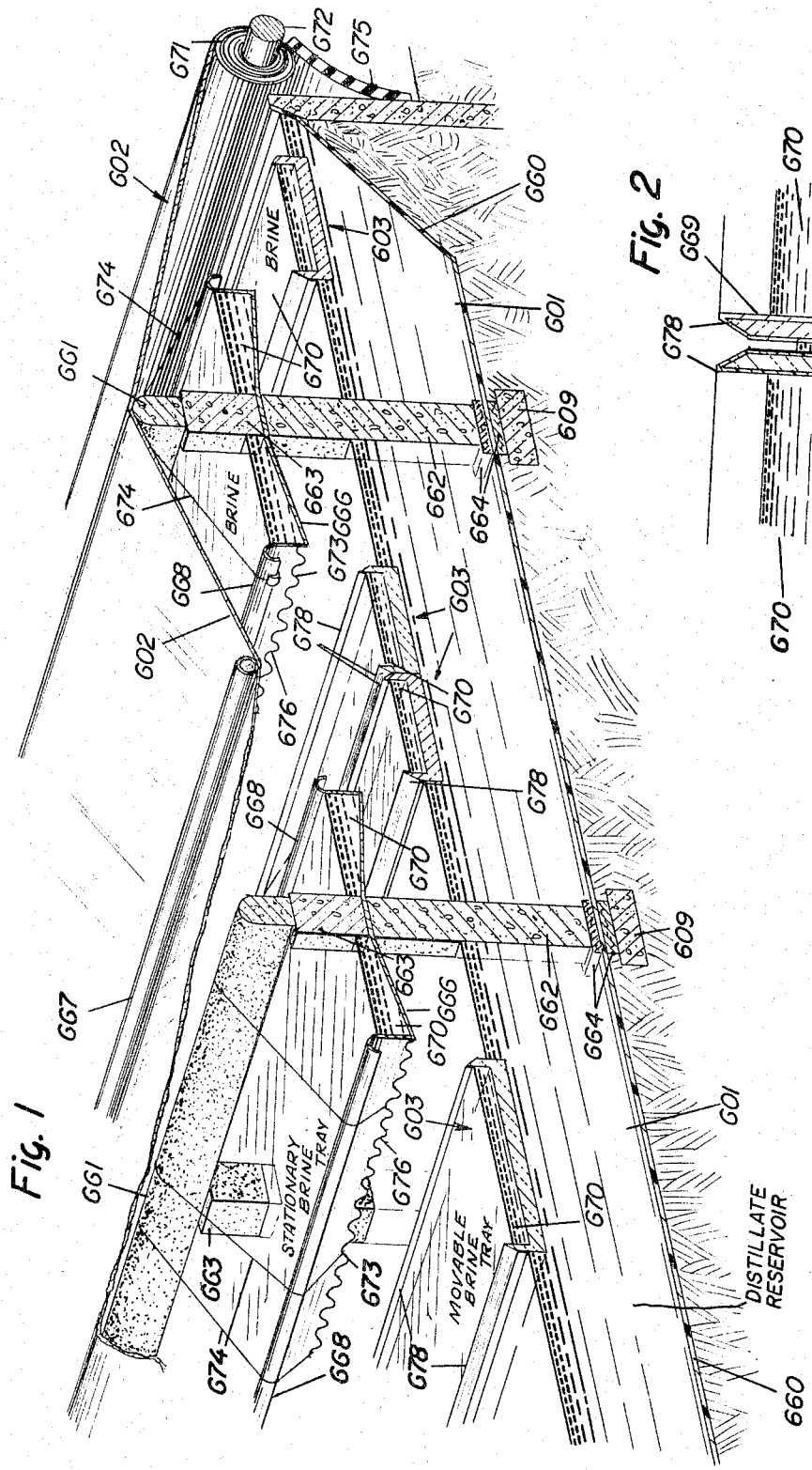

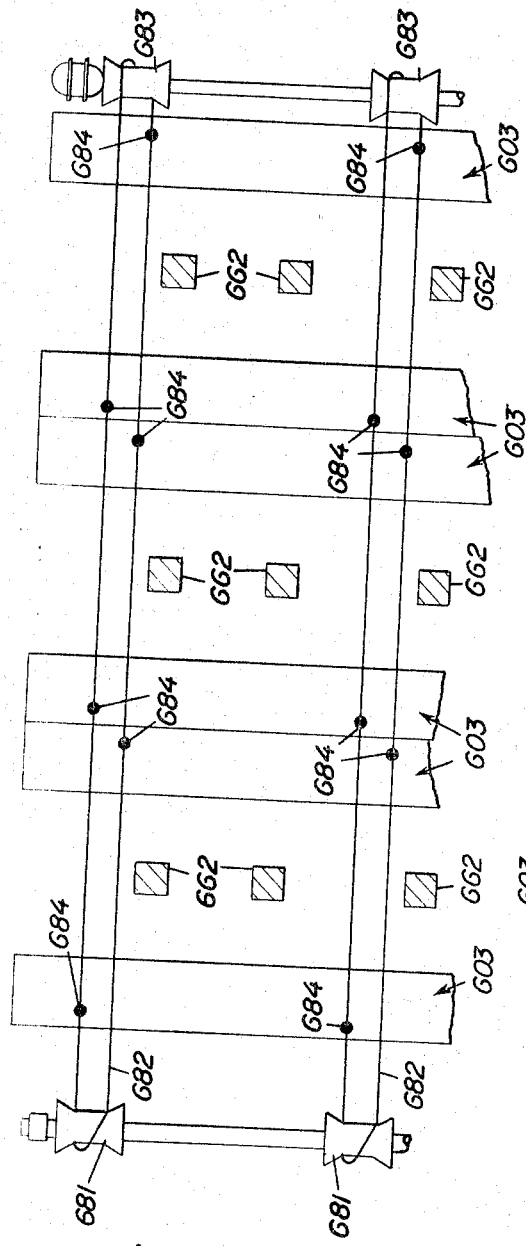
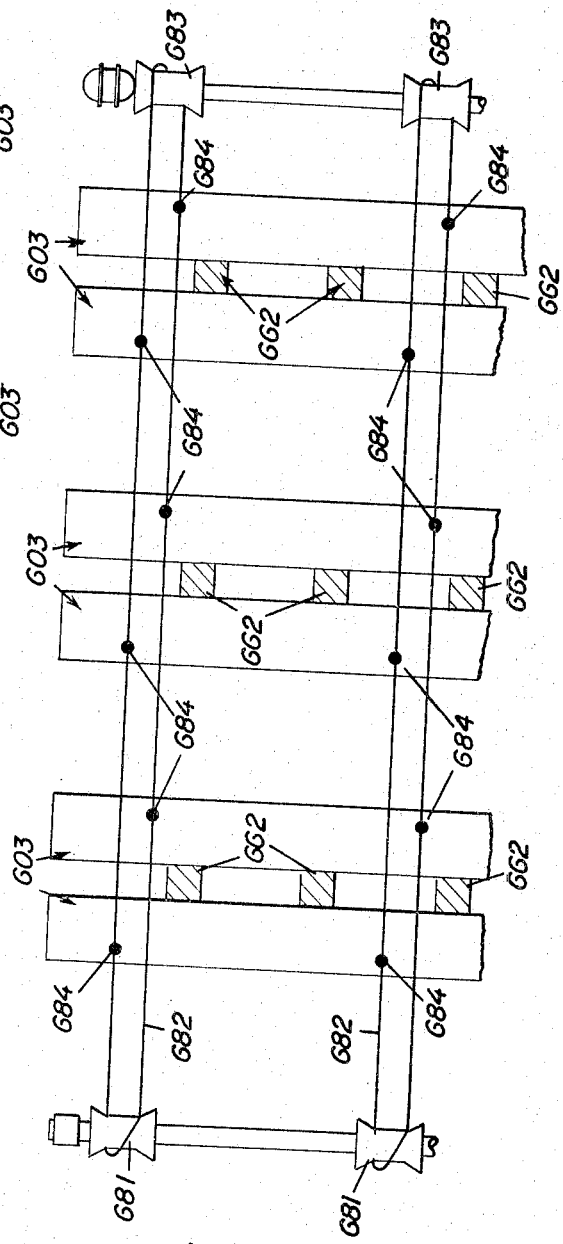
Fig. 3
Fig. 4

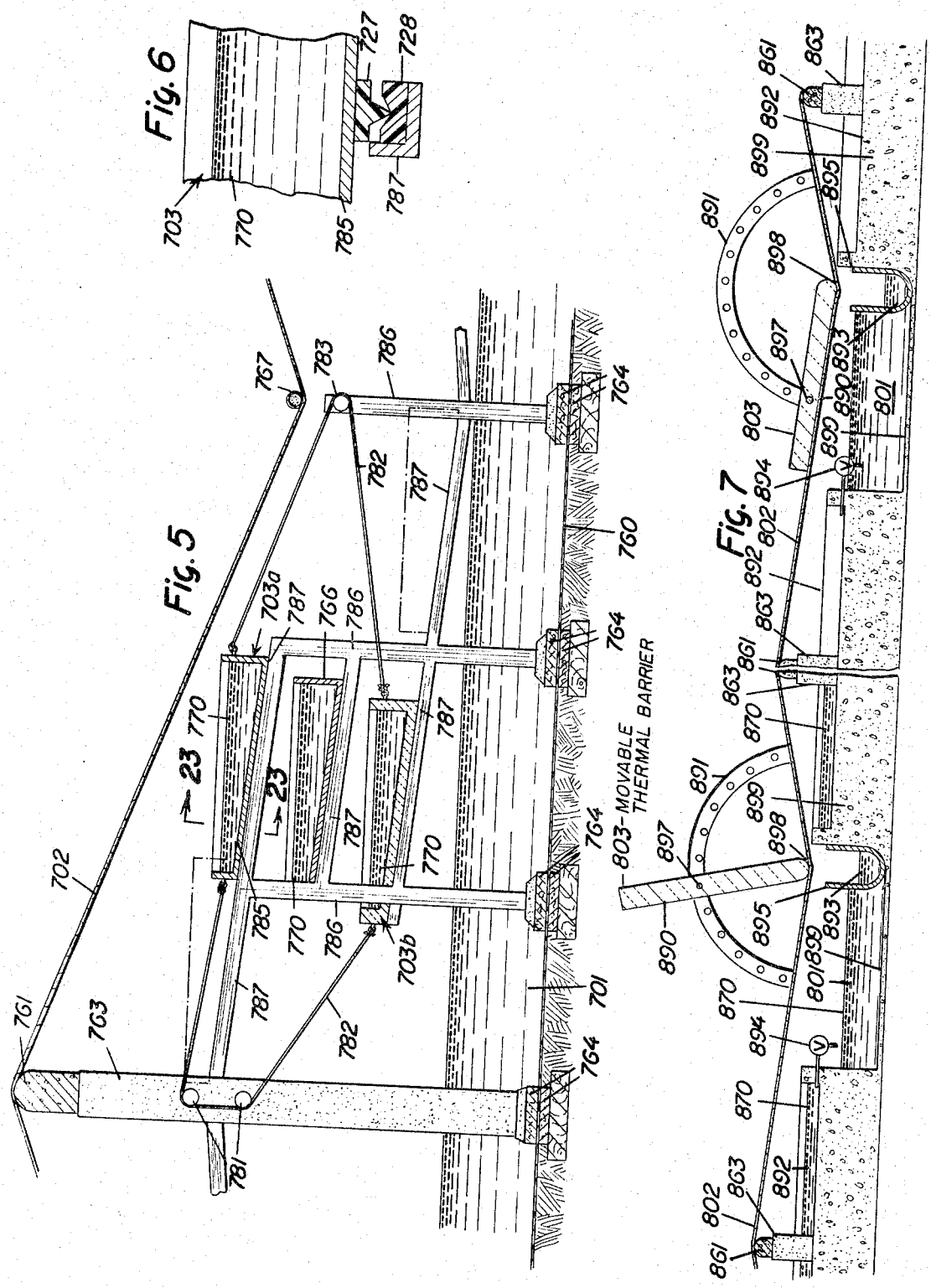

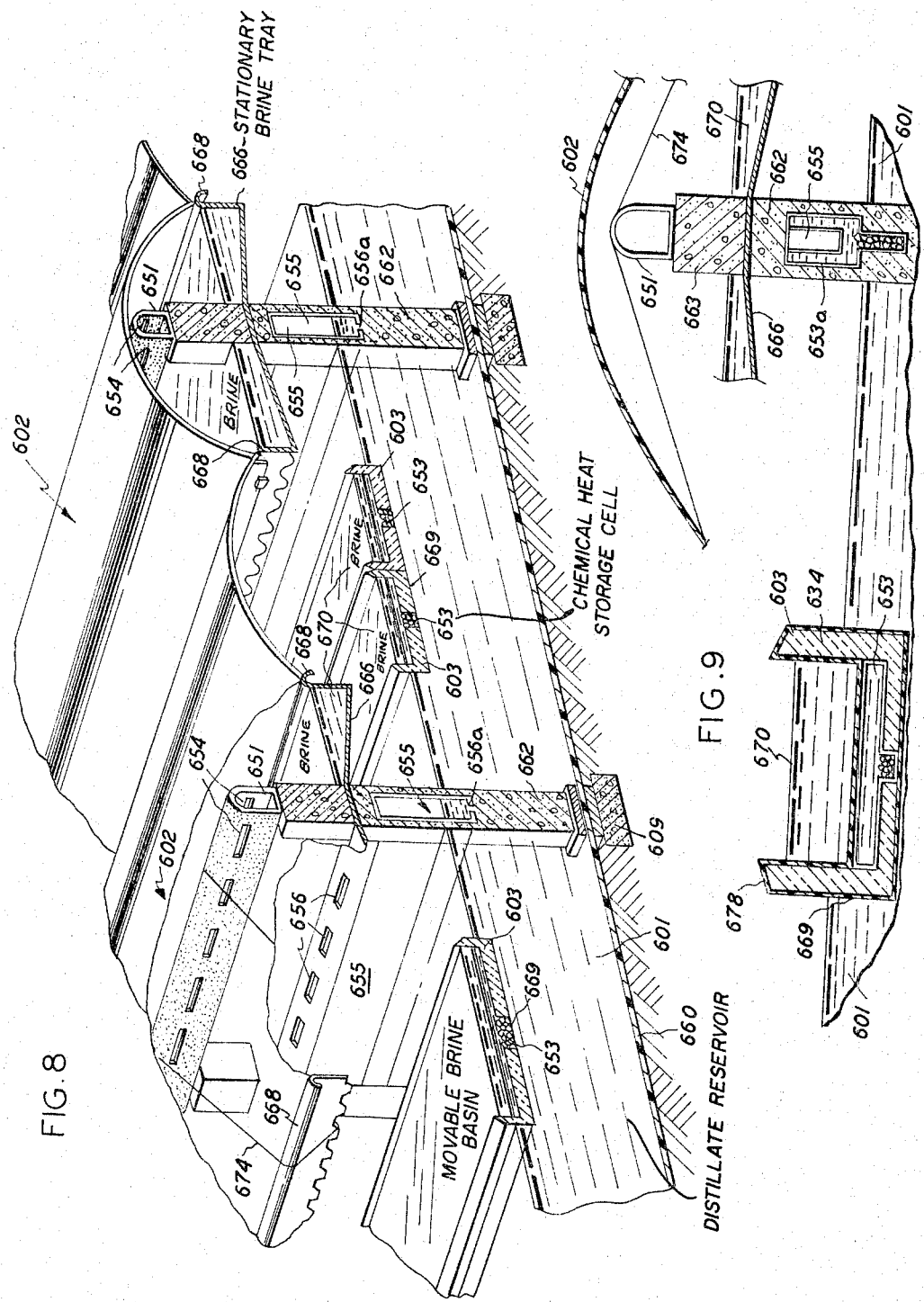

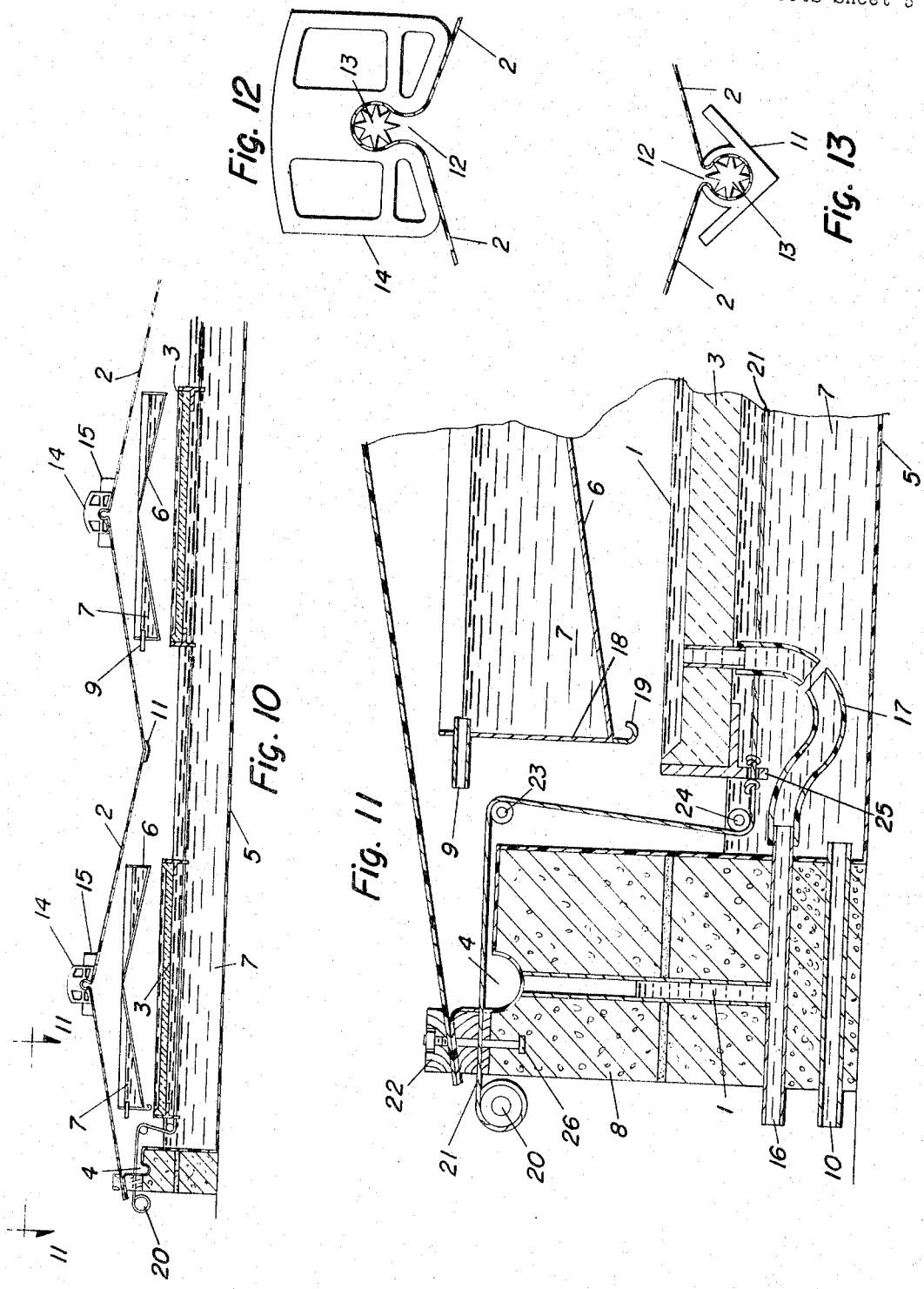

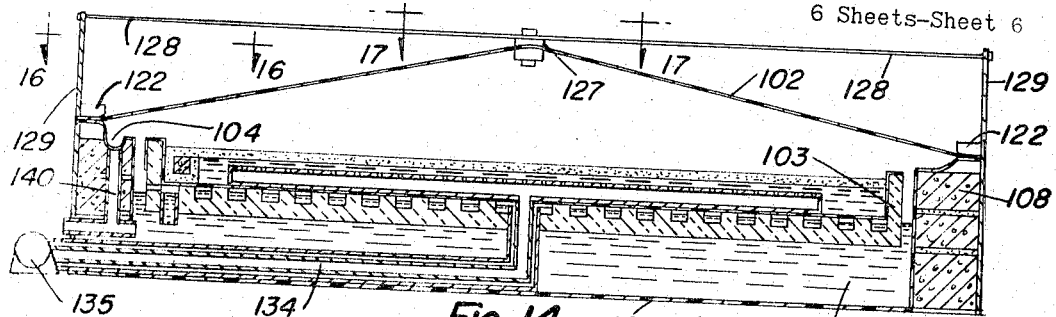
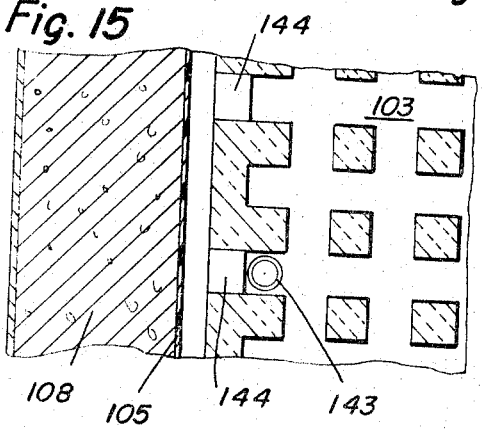
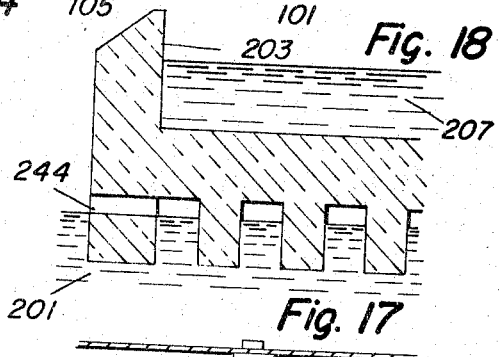
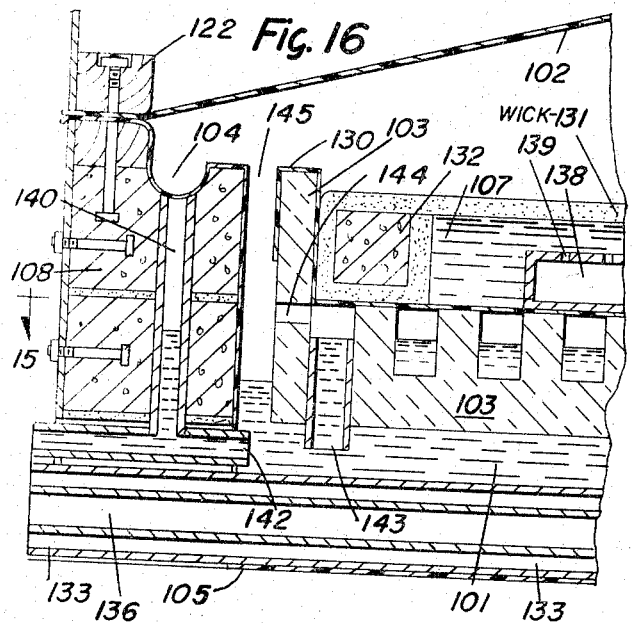
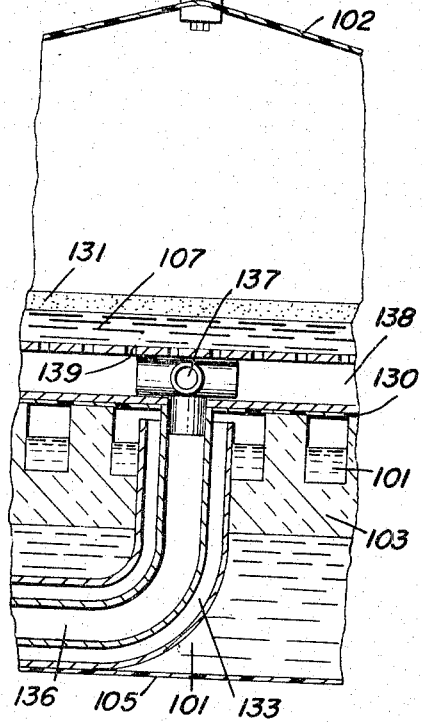

3,314,862
PROCESS AND APPARATUS FOR SOLAR DISTILLATION
Harold R. Hay, 795 Roble, Menlo Park, Calif. 94027
Filed Aug. 16, 1965, Ser. No. 482,032
14 Claims. (Cl. 203—10)

This application is a continuation-in-part of my prior applications Ser. No. 668,202, filed June 26, 1957, and Ser. No. 163,381, now abandoned filed Dec. 19, 1961.

This invention relates to a process and apparatus for solar distillation of saline or brackish water, alcohol, or other liquids volatile at relatively low temperatures.

Despite recent engineering efforts, including elaborate field tests and computerized data, the designs of the 1870's have remained basically unaltered and have given the highest yield and the lowest cost potable water by solar distillation. Efforts to add solar concentrators, condensers, and multiple-effect distillation have proved to be uneconomic, owing to extra cost, additional space, and maintenance. Plastic-cover, air-inflated stills have not proved satisfactory owing to adverse results of power failure and thermal changes such as clouds or rain showers.

It has become apparent that neither major equipment additions external to the solar still, calling for forced recirculation of air and vapors through insulated ducts, heat exchangers, and the like, nor minor changes within the still have altered the economics of production sufficiently to be competitive with other processes for producing potable water. To meet this competitive cost, this invention modifies several still components in novel ways, adds new principles and unifies these novel features into embodiments of higher efficiency than stills of prior art.

This invention has the following objects:

It is one object of this invention to provide an improved device of low cost for the distillation of liquids which will result in more efficient use of available solar energy.

It is an object of the invention to provide a more aerodynamically stable plastic cover which is movable and which has reduced tendency for failure by abrasion, embrittlement, tearing, or deflation.

A further object is to provide a cover which reduces the re-evaporation of condensate formed thereon.

Another object is to modify or eliminate the use of condensate collection troughs which have added to re-evaporation losses of condensate and which have required considerable maintenance.

It is an added object to collect and retain the condensate in an internal reservoir thereby eliminating the need for an extra storage tank, piping, and pumping.

It is moreover an object to utilize one or more condensate reservoirs as a condenser and in manners which will increase the yield of distilled water without the addition of complicated external devices.

It is also an object to provide, overlying the condensate reservoir, brine basins which may be so positioned with respect to each other as to obtain multiple-effect distillation, to cool the condensate in the reservoir, to distribute recirculated air and vapors, and to reduce heat losses.

It is an object to provide a movable thermal barrier within the solar still, or attached externally thereto, which maintains favorable thermal conditions within the still thereby increasing the distillation efficiency.

It is additionally an object to utilize chemical heat storage cells within a solar still and to improve the functioning of the chemical heat storage cells by using the cooled condensate reservoir to maintain a portion of the chemical salts in their solid state.

Yet another object is to provide a solar still adaptable to rough terrain without requiring expensive leveling and to provide a means for maintaining the distilland in a thin layer close to the cover of the still.

Other objects and advantages of the present invention will become more apparent after reading the following description taken in conjunction with the drawings but it is a final object to combine the various improvements comprising this invention so as to produce yields and economies from said combination superior to those of prior art or to those obtainable with the several improvements applied separately, and to allow for that flexibility in choice of a combination which will produce maximum benefit under various conditions of climate, land availability, feed-water supply, still capacity, and financial resources available for construction of the still.

The invention is capable of receiving a variety of mechanical expressions, some of which are illustrated on the accompanying drawings, but it is to be expressly understood that the drawings are for purposes of illustration only, and are not to be construed as a definition of the limits of the invention, reference being had to the appended claims for that purpose.

The following embodiments of the invention relate to an apparatus for distillation, hereinafter simply referred to as a "still," and to a distillation process. More specifically, these embodiments relate to a solar still in which:

FIGURE 1 is a partially cross sectional and partially cut away view of a solar still embodiment with movable thermal barriers in the form of shallow basins confining distilland, the basins floating on a reservoir of the distilate and with said movable thermal barrier basins illustrated in their daytime operating position. This figure also illustrates the use of a cover adjustable by means of a rolling device.

FIGURE 2 is an enlarged fragmentary cross sectional view of two of the movable thermal barrier basins of FIGURE 1 abutting in their daytime position.

FIGURE 3 is a diagrammatic representation of one means by which movable thermal barrier basins are positioned in their daytime relationship shown in FIGURE 1.

FIGURE 4 is a representation similar to FIGURE 3 which shows the movable thermal barrier basins shifted from their daytime location shown in FIGURE 1 and FIGURE 3 to their nighttime position adjacent to the concrete columns supporting the stationary basin and the cover of the still.

FIGURE 5 is another embodiment in which the movable thermal barrier basins are supported above the reservoir of the distillate rather than floating upon it, and in which the distilland basins contain chemical heat storage cells.

FIGURE 6 is a cross sectional view of a portion of the inclined support and the movable thermal barrier basin taken along line 23–23 of FIGURE 5.

FIGURE 7 is another embodiment in which a movable thermal barrier means is externally located with respect to the still.

FIGURE 8 is a partially cross sectional and partially cut-away view of a solar still embodiment having mounted on the stationary brine trays a cover supported by air pressure introduced through a hollow lintel and partially exhausted through a separate conduit serving as a condenser; also, FIGURE 8 illustrates the use of chemical heat storage cells in the floating brine basins.

FIGURE 9 is a partially cross sectional and partially cut-away view of the solar still of FIGURE 8 showing in more detail the chemical heat storage cell in the floating brine basins and showing the addition of a chemical heat storage cell in the conduit under the stationary brine tray.

FIGURE 10 is a cross sectional view of a portion of a still having a bottom brine basin on which floats a distillate reservoir basin positionable over the bottom brine basin and under a raised brine basin.

FIGURE 11 is an enlarged cross sectional view of a portion of the still of FIGURE 10.

FIGURE 12 is a cross sectional view of a means for supporting a solar still cover.

FIGURE 13 is a cross sectional view of a means for suspending a distillate collecting trough from the cover of a solar still.

FIGURE 14 is a cross sectional view of a circular solar still having forced recirculation of air and vapors between a plurality of surfaces capable of condensing vapors, and having a floating basin with a patterned upper surface.

FIGURE 15 is a partial view through the patterned upper surface of the floating basin of FIGURE 14.

FIGURE 16 is an enlarged view of a peripheral portion of the solar still illustrated in FIGURE 14.

FIGURE 17 is an enlarged view of the central portion of the solar still illustrated in FIGURE 14.

FIGURE 18 is a partial cross sectional view of a floating brine tray of the type in FIGURE 1 but with a patterned under surface adapting it for use in a system recirculating air and vapor within a solar still.

Solar stills used for saline water distillation in the prior art have consisted basically of four elements: a closed structure with a transparent portion which allows the entrance of solar radiation; a basin or tray to confine the saline water; a condensing surface which is usually the cover or wall of the still, though in some forms it may be located externally; and a distillate collecting system which is usually a collecting trough connected by piping to externally located distillate storage facilities.

The general use of the still cover both as an entrance for solar energy required to evaporate water and as an exit for latent heat released by condensing water vapors during the hours of high solar radiation obviously is working at cross purposes. Much incoming energy is consumed in re-evaporating condensate and does not penetrate to the saline water in the brine basin. It is reported that in excess of 10 percent of the condensate is so re-distilled either from the cover or from the collecting troughs.

Condensation on the cover also causes reflection of solar radiation. This reflection loss to the atmosphere is especially great when using plastic film covers which tend to cause drop condensation rather that the film condensation obtained with a glass cover. Special treatments of the plastic surface to eliminate the drop condensation are not perfected and add materially to the cost of the plastic cover of the still.

Glass covers on solar stills are costly; they limit the distance from the valley to the ridge of basin stills; they have numerous joints needing special treatment to reduce excessive vapor leakage; and breakage from hail or wind is not only irreparable but causes damage as well to preferred still bottoms. Plastic covers, as used in prior art, have required many fastening points at which stresses are non-uniform thereby causing chafing, abrasion, and embrittlement; large covers have had excessive wind-flutter which has caused condensate to drop back into the brine basin; and the cover has not sufficiently yielded to wind forces but has been torn thereby. These defects of plastic covers have been serious with respect to air-inflated stills, particularly upon failure of the air-inflating means.

Condensate collection troughs generally used in the prior art are expensive to build and to maintain, are subject to leakage and loss of condensate, tend to shade a portion of the saline water basin, and provide another surface from which the condensate, already containing a high sensible heat, is reevaporated. The distillate collected in these troughs is conducted to a sump from which it is pumped to an external tank or reservoir. This installation for pumping and storing adds to the initial investment, to the continued maintenance and to the land requirement for the process.

It has now been established that shallow brine basins with brine depth of two inches or less are the most efficient, and pains are taken to level the still base to prevent high spots which will be dry. Dry spots are not only non-productive but cause "burn-outs" of some basin bottoms and necessitate extensive repairs. Even on favorable sandy land, the cost of leveling prior to erecting a still may be 10 to 20 percent of the total installation costs. Less favorable terrain, particularly rocky areas, may make the installation of solar stills of prior art prohibitively costly.

The water produced by the solar stills of the prior art has left the stills at a relatively high temperature resulting in loss of the sensible heat, and therefore of some potentially useful energy, and supplying consumers with a less refreshing drink than if the water were nearer nighttime temperature.

Many solar stills have used fixed insulating materials under or around the perimeter of the brine basins to prevent heat loss. Such loss is relatively small as compared to the great loss which results from re-radiation from the basin water through the cover. Table I, following, gives thermal efficiency and energy losses of a standard type solar still and is reproduced from an article by Joseph J. Strobel, Chief, Division of Processes Development, Office of Saline Water, United States Department of Interior.

*Table I.—Distribution of Solar Energy in the Evaporation of Water*

| Distribution of solar radiation: | Percentage |
|---|---|
| (a) Evaporation of distillate (efficiency) | 32 |
| (b) Ground and edge heat losses | 2 |
| (c) Solar radiation reflected from still | 11 |
| (d) Solar radiation absorbed by cover | 4.5 |
| (e) Radiation from basin water to cover | 26 |
| (f) Internal convection | 8 |
| (g) Re-evaporation of distillate and unaccounted for losses | 16.5 |
| | 100.0 |

Table I clearly shows that the radiation and re-evaporation losses referred to above are of major proportions and result in the low 32 percent efficiency typical of basin-type stills. Anything which reduces these losses will increase still efficiency and reduce the area which must be covered to produce a given volume of distillate. The very large land requirement for solar distillation by the prior art constitutes a major obstacle to the use of solar energy for saline water recovery.

In the present embodiment of this invention, it is possible by means of a movable thermal barrier to operate a solar still so as to eliminate or minimize many of the above-mentioned disadvantages of the prior art and thereby to obtain a much higher production efficiency and lower distillate cost.

FIGURE 1 illustrates a solar still which consists of an enclosure having an exterior surface a first portion of which is a material having high thermal storage characteristics in the form of a reservoir of water 601, this being the collected distillate of the distillation process a substantial portion of which is retained within the still for its heat capacity effects. FIGURE 7 shows the concrete base 899 of a still which would also correspond to a first portion of high thermal storage characteristics though in this case the brine to be distilled and the ground below the still may be so considered as well.

The second portion of said enclosure of FIGURE 1 is the cover 602 which should preferably be transparent or translucent and may consist of glass, plastic film, or other material capable of transmitting solar energy. The cover may be a plurality of sheets of such materials and it may be a combination of them. Available plastic films of excellent solar energy transmitting characteristics are polyvinylfluoride, polytetrafluoroethylene, polychlorotrifluoroethylene, polyglycolterephthalate and other types. This element of the enclosure has low thermal storage and high heat transfer characteristics by virtue of the thinness of the cover material used.

The third major element of this embodiment is movable thermal barrier 603 of FIGURE 1. In this instance, the thermal barrier serves as a basin to contain saline water (hereafter referred to as brine or as the distilland). This movable thermal barrier is preferably composed of low density and lightweight materials having low heat capacity and low thermal transfer characteristics. The thermal barrier may be of the rigid closed-cell type such as cork, foamed glass, or some forms of foamed polystyrene or it may be of the semi-rigid type of open-cell foamed polyurethane. Mineral wool, glass fiber, or wood fiber batts confined within a suitable material may be used or aluminum foil, plastic sheets with vacuum deposited metal surface, a painted surface, or other reflective insulation alone or in combination with other insulators may be used. In a solar still, the movable thermal barrier means may consist in part of the distilland either supported on an insulating material or supported on a non-insulating material. As shown in FIGURE 1, movable thermal barrier basin 603 is all or in part low density insulation which facilitates the movement of the basin by causing it to float on the surface of reservoir of distillate 601. In other cases, as in FIGURE 5, some of the movable thermal barrier basins 703b are insulated while others 703a may not be insulated but depend instead upon the thermal storage characteristics of the brine contained therein to function as a thermal barrier within the meaning of the invention. As will be described later, these brine basins may be integrated with chemical heat storage cells 753a and 753b. Obviously other high heat capacity materials suitable for distillation can also retard an external energy source from heating the portion 601 which is also of high heat capacity. In another embodiment, as shown in FIGURE 7, the movable thermal barrier is mounted external to the still and differs from the corresponding thermal barriers of embodiments illustrated in FIGURES 1 and 5 by virtue of functioning as a part of a still without being a basin confining distilland.

In addition to the three major components mentioned, the still of FIGURE 1 consists of plastic sheet 660 underlying the still and providing an impermeable base to support and retain the internal reservoir of accumulated distillate 601. Owing to the overlying brine trays of the embodiment shown in FIGURE 1, the still bottom is shaded from actinic rays during the daytime. Moreover, it is normally covered with a layer of water at a temperature lower than that of the evaporating brine hence it can be of less durable, and less expensive, material than that needed in solar stills of the prior art. Thin, low-cost polyethylene film may be used for the impermeable base resting directly on relatively unleveled ground and said polyethylene may be heat-sealed or sealed by suitable adhesives to form a base of unlimited size. It is equally possible to make impermeable base 660 of other plastics such as polypropylene, or of metal films, such as copper or aluminum foil, or of sheets of rubber and the like, or of thicker mats of asphalt or asphalt impregnated materials, or of sheets of sprayed-in-place foamed plastics, or the base can be made of heavier concrete construction 899 as is shown in FIGURE 7. In all instances, the edges of the base materials are raised or sealed at the perimeter of the still to form a reservoir capable of containing high heat capacity liquid 601 which is here described as distillate water but which may be any other distillable material, such as alcohol, having a sufficiently high vapor pressure. Also the still may be used for objectives other than for the recovery of the distillate, as for instance, the concentrating of sugar or salt solutions.

The cover 602 of the still is supported by a plurality of lintels 661 running the full width of the still in parallel rows (e.g., about eight feet apart in the present embodiment). Lintels 661 are supported by spaced columns 662 which also support stationary brine tray 666, which will be described later. The weight, supported by columns 662, bears onto protective pads 664 on both sides of impermeable base 660 thereby preventing the base from being ruptured by sharp column edges or by the excessive loading from columns 662. A footing or foundation 609 distributes the loading from columns 662 to the ground under the still. In other embodiments the columns can be avoided by suspending the lintels and trays across the width of the still on the supporting side walls as in FIGURE 10.

Lintels 661 may be of reinforced or prestressed concrete, or of corrosion resistant metals such as aluminum alloy No. 5086, or of decay resistant wood such as the heart portion of redwood. Columns 662 and footings 609 may be of concrete blocks, brick masonry, or of any material suitable for the lintels. If wood footings are used they should be chemically preserved. It is advisable also to treat the ground under the still with a herbicide to prevent plant growth from rupturing impermeable base 660. The column pads 664 may be made of rubber, fiber, asphaltic materials, cork, plastic, or of any material inherently or compounded to be resistant to flow under continued loading and capable of protecting base 660.

The cover 602 can be fastened to its supporting lintels 661 but in the embodiment illustrated in FIGURE 1, it is allowed to drape over rounded lintels 661 and is caused to assume the angular roof shape by applying a weight 67 which is sufficiently heavy to produce the desired shape but not so heavy as to cause excessive elongation or fatigue in the film cover 602. The weight which can be supported varies with cover composition and thickness. If needed, an additional thickness of the cover material 602 may be applied to the film cover by means of heat sealing or by adhesives to add strength at the ridge over lintels 661 or at the valleys under weights 667; they would also provide tear stops which would reduce storm damage.

The weights 67 are represented as plastic tubes filled with sand or other material of suitable density and these weights preferably extend the full width of the still. Under certain circumstances, it may be desirable to use the plastic tubes as conduits for the distilland which would then become preheated in the daytime and could be used as make-up for the distillation process. Round metal bars or other rigid materials could be used as weights 67 and said rigid bars could be attached, externally to the still, to an actuating means which causes them to move horizontally parallel to the base of the still, between the columns and lintels supporting cover 602. Such sideways movement will, of course, change the angles which the cover makes both to the still base and to the source of radiant energy such as the sun so that the angle of incidence remains favorable to maximum absorption.

Flexible materials are preferred as cover weights 667 in some embodiments of the invention since one purpose of draping cover 602 over lintels 661 by means of weights 667 is to make it possible to vary the pitch of cover 602 through movement of said weight in a vertical rather than in a horizontal plane to provide a correct angle relative to the incidence of the solar rays, or to minimize the distance of the film cover from movable thermal barrier basin 603, or to increase the pitch to permit better drainage of condensate and so reduce refluxing of condensate into the brine basins, or to change the external shape of the still so as to reduce wind damage, or to vary the superficial condensing area of the cover in relation to the evaporating surface within the still, or to act as a valve adjustment means for varying the distance or space between cover 602 and lip 668 of stationary brine tray 666, as may be desired at any time by either rolling or unrolling a part of cover 602 on a roller 671 suitably fastened at one or both ends of the still and actuated through a shaft 672 by a crank or reversible motor (not shown).

The cover may also terminate in a small roll of plastic film at the other end of the still (not shown) and periodically the cover may be shifted one or two inches on the opposing rolls whereupon new portions of the plastic film would absorb the chafing and the elongation and flexing stresses at the ridges and valleys in the cover. Longer life for the film is thus assured with this free-draping cover capable of having stress points changed, of having a minimum of fastening points, and of being freely suspended to yield to high wind loading so as to produce the strongest possible aerodynamic form.

The space adjustment between cover 602 and lip 668 of stationary brine tray 666 materially affects the vapor convection pattern within the still and especially above tray 666. A narrow space setting will cause brine 670 in tray 666 to distill largely independent of the rest of the still, but condensate collecting on cover 602 over tray 666 will drain past this narrow space to the valley under weight 667 where it will drip into distillate reservoir 601. When the space between cover 602 and lip 668 is greater, convection currents will conduct vapor and hot air from the area over tray 666 to the space under said tray where it will give up some of its heat to the bottom of said tray while solar radiation is increasing the temperature of brine 670 in said tray by direct absorption. In this manner the brine is raised more quickly to the distilling temperature than would otherwise be the case. This represents one advantage for raised tray 666.

The bottom of stationary brine tray 666 can rest directly on columns 662 and on the side walls (not shown). A short lintel-supporting column 663 rests inside tray 666 and extends upwardly from that portion of said tray which is resting on column 662. Obviously, an equivalent structure could be achieved with centrally apertured trays which permit a single column to extend from the base of the still upwards to the lintels with these columns having a shoulder provided at the appropriate height on which trap 666 may rest.

The lintel-supporting column 663 may be made from any material used for column 662. Stationary tray 666, which extends either the full width of the still or is a plurality of shorter lengths, is made from vacuum-formed plastic, from fiberglass reinforced polyester resins or it may be made from polypropylene, from asbestos cement, or from corrosion resistant metals. It is advantageous to paint or spray the interior of said tray a black color, or to add pigmenting substances for integral blackening of the tray material, or to lay within said tray a sheet of black material or a black acrylic or polypropylene textile, to promote solar absorption, as is known in the prior art.

In the embodiment of FIGURE 1, stationary try 666 is provided with a lip 668 continuous along the length of said tray so that said lip provides a longitudinal strengthening which is complemented in the transverse direction by corrugations 673. Lips and corrugations are well recognized means for maximizing strength of thin section trays made by molding or spraying processes. If such modifications in shape of tray 666 should not be adequate to bear the weight of brine 670 over the span provided between the columns 662 or in the part of said tray cantilevered outward from said columns, tie cords 674 of fiberglass, stainless steel or of other non-deteriorating material can be passed over the lintels 661 at appropriate distances and either fastened into lip 668 of tray 666 by any suitable means or said tie cords may be passed completely under said tray and fastened in such a manner as to give the desired support.

The bottom of the stationary tray 666 is preferably sloped from the center toward the edges at an angle of approximately 10° or greater so that condensate from vapors coming in contact with it will drain to outer edges 676 of said tray and drip from this point into underlying reservoir 601. This is of special significance when movable thermal barrier 603, serving also as a basin confining brine 670, comes into use as will now be described.

The movable thermal barrier 603 may be made as shown in FIGURES 1 and 2 of any insulating material which is resistant to water and water vapor and which provides an apparent specific gravity less than that of the distillate. In the presently preferred form it consists of foamed plastic 634 of the type of polyurethane or polystyrene of the closed-cell structure and with a thin skin 669 of an impervious plastic coating which serves to hermetically seal the insulation from both the distilland and the distillate.

In the embodiment of FIGURE 1, movable thermal barrier 603 extends the full width of the still, or it may be made up of a plurality of shorter lengths, and is shaped into the form of an elongated basin capable of confining brine 670. The thickness of the insulation on the bottom of the now-formed thermal barrier brine basin is usually one inch or more and is greater than that on the sides since heat transfer will be primarily through the bottom; excessive side thickness reduces the area of brine exposed to solar energy absorption and to evaporation. Black or dark colored materials may be used on or in these basins as was noted with respect to stationary brine trays 666.

The sides of thermal barrier brine basin 603 are sloped (as indicated at 678) at a point above the level to which said basin settles into reservoir 601 as is most clearly shown in FIGURE 2. Also one side is projected downward beyond the bottom of said movable basin so as to form a thickened high density edge or a plurality of downwardly projecting tabs 680 which may be perforated. The use of sloped sides 678 and tabs 680 will be explained hereinafter.

The movable basin 603 floats on distillate reservoir 601 of FIGURE 1 and is capable of being positioned lower than and outside of outer edge 676 of stationary tray 666 but no farther out than the valley of cover 602 made by weights 667. This is the daytime positioning of basins 603 and when so positioned, except at the sides of the still field, two adjacent basins abut as shown best in FIGURE 2. Here it is clearly shown that sloping sides 678 of said abutting basins form, for all practical purposes, a condensate collecting trough which allows the drippage of condensate falling from the valley of cover 602 to pass into reservoir 601 without splashing or draining into brine 670 within basins 603.

Floating brine basin 603 is likewise capable of being positioned during nighttime under stationary tray 666 and adjacent to column 662. In this position sloped side 678 also provides a splashboard which deflects condensate dripping from edge 676 of tray 666 from falling into brine 670 of basin 603.

The means for moving the thermal barrier brine basins from their day and night positions is illustrated in FIGURES 3 and 4. A plurality of drawline loops 682 are fastened at 684 to downwardly projecting tabs 680 of FIGURE 2. Drawline loops 682 extend from one end of the still field to the other and at one end pass over idling pulleys 681 while at the other end they engage a drive mechanism 683 which may be actuated by a reversible motor or by a manual crank. Said drawline loops may be made of the materials previously described for tie-cords 674 or of polypropylene fibers.

When one line of drawline loop 682 is securely fastened at 684 to all movable basins 603 lying immediately to the left of the plurality of rows of columns 662 in a still field and the other line of the same loop is fastened securely and without slack at 684 of all basins 603 lying immediately to the right of said rows of columns, and when all loops 682 are actuated by the same drive 683, it is apparent that tension on corresponding sides of the loops will draw half of basins 603 in one direction and the opposing directional movement of the other line of the loop will draw the other movable basins in the opposite direction as is required for the present embodiment of the invention. This positioning of basins 603 provides many advantages not obtainable with solar stills of conventional design.

The feeding of brine can be through side laterals into the stationary brine trays 666 and through overflow pipes (not shown) in these same trays to the underlying floating brine basins 603. The concentrated brine would be drained from the movable basins through an overflow pipe (not shown) connected by plastic tubing to a conduit (not shown) which passes out of a side or end of the still at a level below the bottom of the floating basin 603. Suitable means for introducing saline water and removing concentrated brine are well described in the prior art.

The major advantage of this embodiment derives from the fact that during the nighttime the movable thermal barrier brine basins 603 are not exposed to radiation loss of heat to the sky but instead are shielded from such loss by stationary brine tray 666. Table I shows that nearly as much absorbed solar energy is lost by radiation from the brine surface to the sky as is used to produce distillate. Because of this loss of heat from shallow basin stills using the prior art, very little production of distillate occurs after the sun goes down and there is about a two-hour lag in the morning before the brine reheats to the temperature required for distillation. This serious loss of energy is minimized in the present still. The movable brine basins continue to distill water with heat lost in the prior art and furthermore basins 603 shielded by trays 666 will be warmer in the morning thereby requiring less time to be operative and contributing to a higher efficiency.

Another major advantage derives from the multiple-effect distillation obtained by positioning movable thermal barrier brine basins 603 under stationary brine trays 666. Vapors from said basins 603 condense on the underside of said trays 666 and give up their latent heat to the contents of said trays. This offsets heat loss from the brine 670 in tray 666 to the night sky and causes distillation from tray 666 to continue longer into the night. It also causes said brine to be warmer in the morning so that it too will heat faster to a temperature favoring rapid distillation. The condensate from the distillation effected in basin 603 drains off the sloping bottom of the stationary tray and drips from its edge 676 into the reservoir while that from brine in the stationary tray condenses mostly on cover 602 and drains toward the valley where it drips into reservoir 601.

For effective use of multiple-effect distillation, it is obviously necessary for movable basin 603 to have its brine 670 heated during the daytime. This is accomplished by moving said basin out from under stationary trays 666. At this time nearly 100 percent of the area of the still is effective in absorbing solar energy.

Another great advantage derives from the fact that positioning movable brine basin 603 under stationary brine tray 666 exposes a greater portion of reservoir 601 to the night sky and said reservoir loses heat to such an extent that its temperature approaches that of the night air if the reservoir depth is not more than about four inches. This heat loss is caused by redistillation and refluxing of distillate from reservoir 601 during the night and by direct radiation from the reservoir to the cold night sky. In the morning when solar radiation again enters the still, basin 603 is again positioned away from columns 662 and near the valley of cover 602. In this daytime position it is not only fully exposed to absorb solar energy but it also shades reservoir 601, thereby preventing said reservoir from being heated by direct solar radiation. Thus basin 603 keeps the reservoir temperature far below the cover temperature during the day and creates a new internal condenser which shall hereafter be called the reservoir-condenser in contrast to the cover-condenser.

The two above-mentioned condensers of the present still act in conjunction to increase the efficiency of the distillation process in the following manner. During daylight, the temperature of cover-condenser 602 usually exceeds external air temperatures by more than 10° F. This is owing to the fact that the vapors within the still are 15 to 40° F. hotter than the outside air temperature as a result of the "greenhouse effect" utilized in solar stills. In contrast to the quickly rising temperature of cover-condenser 602, reservoir-condenser 601 heats very slowly during daylight hours. Its rise in temperature results largely from absorbing sensible and latent heat of vapors which condense on its surface plus a smaller absorption from hot air which circulates by convection with the vapors originating in either the moving brine basin or the stationary brine tray. The reservoir-condenser is also heated by the sensible heat of the condensate dripping into it from cover-condenser 602 or from the sloping underside of the stationary tray 666 which operates during the nighttime as a third internal condenser, hereafter called stationary tray condenser 666. The present still clearly has a plurality of self-contained condensers.

At different times of day, each of the three internal condensers will now be seen to act in different manners. The largest temperature differential will exist between the increasingly hot brine 670 and the slow-heating colder reservoir-condenser 601. If a black textile wick is floated upon the brine in the trays, the upper surface of the wick will be the hottest portion of the still. This causes a convection pattern of air and vapor within the still which continues distillation at a high rate during the day and condenses a portion of the distillate at the surface of reservoir-condenser 601 under tray 666. This convection current will also cause hot brine vapors to come in contact with tray condenser 666 and to give up heat to it during condensation. Thus productivity during the day is enhanced. There may also be daytime condensation on cover 602 as in the prior art but the amount of this is reduced by virtue of the distribution of vapors to the other condensers which are lower in temperature.

An important aspect of the present still is the ability, under certain operating conditions, to maintain production as a result of having reservoir-condenser 601 and tray-condenser 666 active even if cover-condenser 602 is not functioning as a condenser. If it is not condensing, it may be referred to as a relatively "dry" cover and obviously such a cover does not interfere with, or interferes less with, the transmission of solar radiation. It would be highly desirable to obtain a relatively "dry" cover 602 during part or all of the hours of peak solar radiation from 10 a.m. to 4 p.m.

A relatively "dry" cover can result from a combination of the following provisions: (1) the condensing capacity of the present still has been greatly increased through the addition of reservoir-condenser 601 and tray-condenser 666; (2) the volume of vapor moving toward the cover has been reduced by the convection toward the colder condenser 601 and 666 and can be varied by properly positioning flexible cover 602; (3) chemical heat storage cells have been disposed within the still serving purposes to be described later; (4) forced circulation of air and vapors can be used in conjunction with the reservoir-condenser as will also be described later; (5) make-up distilland can be added to the basins during hours of peak solar radiation so as to increase the brine-to-cover temperature differential preventing condensation on cover 602 but not stopping condensation on the colder condeners 601 and 666 nor interfering with nighttime distillation; and (6) multiple covers may be used with forced recirculation of vapors within the still. Not all of these provisions need to be used simultaneously to obtain a "dry cover"; the combination used may be varied according to the requirements.

The reduction of condensation on cover-condenser 602 during daylight hours is further diminished by virtue of redistillation of the now minor volume of condensate particularly when a multiple cover is used, whereupon there will be no film formation on a glass cover and no drop formation on a plastic cover to reflect incoming solar radiation. Then the greater entrance of solar energy will tend to heat the brine and the vapors and air below the cover 602 to a higher temperature than would be the case when condensation occurs on the cover. With internal forced recirculation of the vapors and air, the condensation would then occur on the colder internal condensers 601 and 666.

The U.S. Department of the Interior studies confirm that the distillate yield from increasing solar absorption is disproportionately greater than the actual increase in energy absorbed with this statement: "Productivity increased threefold when solar radiation increased twofold from 1000 to 2000 B.t.u./sq. ft./day." The benefit of getting greater solar energy absorption through cover 602 of the present still during the daytime hours is further compounded by using this greater absorbed energy in multi-effect distillation made possible in the present still by movable thermal barrier brine basins 603.

By developing a relatively "dry" cover 602 during hours of peak solar intensity, the problem of drop condensation on untreated plastic film covers is minimized and specially treated film covers are not required. This drop condensation will, in fact, occur at other hours, and especially during nighttime, but then it does not interfere with absorption of solar energy. During these hours cover-condenser 602 becomes the major condenser and it condenses not only vapors from brine 670 in stationary brine tray 666, but also those originating from the then warmer reservoir-condenser 601. Thus reservoir distillate 601 refluxes giving up its heat through drop condensation on cover 602 during the night. In this manner, if relatively shallow, the distillate reservoir reaches morning temperature which closely corresponds to the minimum nighttime temperature.

It is obvious that the depth of stationary tray 666 and movable basins 603 may be varied and that this will also affect the distillation process. In stills based on prior art, a shallow basin becomes hotter and distills at a higher rate during the day than does a deep basin of twelve-inch depth, but the deep basin retains its heat longer and distills longer into the night. In the present invention tray 666 and basin 603 may be both of the shallow type, both of the deep type or a combination of types.

It has been established that the shallower the brine in a basin the greater the efficiency of the still. Owing to difficulty in leveling a large still base, the latest recommendation for building stills according to prior art calls for basins averaging two to four inches depth in order to avoid dry spots. This accounts for the high efficiency of stills designed according to the present invention which permits shallower basins. Brine in the trays 666 can be from one-half to one inch deep since these trays are relatively small in comparison with the total area of a large still and the trays can be easily leveled on side walls and supporting columns. The leveling of basins 603 floating on the condensate reservoir is automatic and very shallow brine layers can be used as long as the basins 603 themselves have bottoms of flat and uniformly thick material.

The more closely the depth of movable thermal barrier brine basin 603 approaches the depth of reservoir-condenser 601, the more completely will the positioning of said movable basin under stationary tray 666 displace reservoir-condenser 601 and move it to a nighttime position favoring refluxing and radiant heat loss.

If circumstances should arise in which demand for distillate leaves inadequate volume in the reservoir to permit repositioning movable basin 603, then said basin is left in its daytime position and it operates throughout the day in the same manner and at the lower production efficiency of the prior art.

In this embodiment, it is obvious that two or more covers 602 could be draped over lintels 661 using a plurality of weights 667, one for each cover. Such a plurality of covers results in an increase of the "greenhouse effect." A further benefit from multiple covers derives from the reduction or elimination of wind flutter on the lowermost cover which may be serving to a degree as a condenser especially at night. The combination of wind flutter and drop condensation would cause many of the droplets formed on the cover to fall back into underlying brine instead of running down the cover to the valley made by weight 667. With the multiple cover still just described, it is possible to adjust only the top cover angle to the desired incidence and the lowermost cover can be adjusted to a correct angle and distance with relation to lip 668 of stationary tray 666 as previously described. It is also possible to use a very thin plastic film for the lowermost cover since this is not directly affected by varying external factors, such as wind pressure and other forms of damage, but is sheltered therefrom by the uppermost cover. When using multiple covers, an additional condensing surface is advisable and forced recirculation of air and vapor is preferred.

As an additional means of preventing condensate reflux, the lower surface of cover-condenser 602 may be striated to minimize formation of large condensate drops which may become disengaged and, instead, to cause small drops to form a stream and flow continuously to the cover valley made by weights 667. Thus the under surface of the cover may be embossed or wire brushed to form parallel striations from the lintel toward the valley. For example, a cover 3 mils thick may have ridges 1 or 2 mils thicker or a cover 4 mils thick may have grooves 1 mil deep with said ridges or grooves being close together to produce channels directing the flow of condensate toward the proper collection point. It is not essential that the parallel striations should be at right angles to the lintel and valley but they may be diagonal thereto and cause the desired flow toward the valley of the cover or toward the collection point, which may be at the sides of the still.

As an alternate means for positioning the valley of the cover so as to alter the angle of the cover surface with respect to solar radiation, one can attach to, or form integrally into, the cover a plurality of parallel tubes of transparent material which can be of the same composition as the cover and the same width as the still. Said plurality of parallel tubes may be from one-fourth to one-half inch in diameter and spaced a foot part, for example, and terminate in plastic pipe fittings such that any one or all of the tubes may be filled with water thereby becoming equivalent to weighting means 667 which causes the cover to assume a desired shape. By filling the tube closest to one of the lintels supporting the cover, a steep angle will be made to a valley in the cover near that lintel and a lesser slope will be made toward the next lintel supporting the opposing side of the cover. By emptying this tube and filling another at a greater distance from the first lintel, the valley in the cover will be moved away from said lintel and the cover will assume a different angle with respect to the solar rays. In this manner adjustments may be made daily or seasonally so as to maximize the absorption of solar energy through the cover. Additionally, it would be possible to fill two or more tubes if this should be desirable to stabilize the cover during a high wind which would otherwise cause a less taut cover to be damaged.

As another modification of the cover, one can eliminate the draping cover, the weights, the lintel and the lintel-supporting column and mount an air-pressure supported plastic cover directly on lips 668 of stationary brine tray 666 containing brine 670; this method of mounting a cover is illustrated in FIGURE 8. In this manner one arched cover-condenser is located above the stationary tray while another bridges the space between parallel rows of stationary trays. In this form, condensate from both arched covers will drain toward the fastening points at the lips of the trays and will drip from this point into the distillate reservoir 601. A blower, mounted either within the still or externally adjacent thereto, is used to provide air pressure of about one-fourth inch water gauge or more to inflate the still.

A further modification of the solar still, shown in FIGURE 8, utilizes a lintel structure similar to that of FIGURE 1 but made as a hollow metal or plastic conduit 651 with a plurality of perforations 654 adequately spaced along the full length of the lintel. Air required to provide internal air pressure supporting the arched plastic covers 602 may be introduced into the still through said hollow lintels. A second perforated hollow conduit of metal or plastic 655 can also be mounted into the columns 662 below stationary tray 666 either above reservoir-condenser 601 or partially extending downward into said reservoir-condenser and said conduit 655 can be attached to the vacuum side of the same blower which is causing air to enter the still through lintel-conduit 651. By this means, a forced circulation of air within the still is obtained which displaces saturated vapors over brine 670 in tray 666 causing said vapors to pass around lip 668 of said tray and to give up some heat to the underside of said tray while moving toward conduit 655 mounted above or partially in the reservoir-condenser. The vapors will then partially condense within conduit 655 and condensate therefrom can be drained, by means of suitable perforations 656a, or water-traps, into reservoir-condenser 601. This recirculation of air and vapors within the present still will yield advantages obtained in the prior art by removing the hot vapors from the still to an external condenser and then returning the cooler air and vapors to the still. Thus the internal reservoir-condenser eliminates the need for an external condenser in a forced recirculation system.

The above-mentioned internal air and vapor recirculation, brought about by a suitable blower (not shown) mounted either within the solar still or externally adjacent thereto, may be used irrespective of the type of cover on the still. It is essential, however, that the still contains an internal condenser such as the cover, the condensate reservoir, a chemical heat storage cell, distilland, or a portion of the still in contact with ground or sea water and that this internal condenser has a temperature below that of the air and vapors being recirculated.

FIGURE 9, in conjunction with FIGURE 8, illustrates an air and vapor recirculation process similar to that disclosed above and illustrated in FIGURE 8 but with a chemical heat storage cell added. The composition of the chemical heat storage cell will be disclosed later. The chemical heat storage cell 653a partially surrounds second conduit 655; vapors passing through said conduit are condensed on the walls and give up their latent heat and part of their sensible heat to the chemical in said cell. The air with a lower moisture then passes through suitable headers to the blower, is returned to lintel-conduits 651, is forced out perforations 654 therein, and is passed across heated brine 670 where it is recharged with moisture en route to perforations 656 in conduit-condenser 655. Water condensed in conduit-condenser 655 partially surrounded by heat storage cell 653a may be drained to reservoir 601 or removed from the still through a suitable water trap.

During the nighttime, the flow of air in the process illustrated by FIGURE 9, in conjunction with FIGURE 8, may be reversed by the blower so as to absorb heat from the cell 653a while passing through what is then a heating-conduit 655 and out perforations 656 therein. The heated air next passes between the bottom of stationary brine tray 666 and movable brine basin 603 then in its nighttime position under said tray. The air gives up a portion of its heat to the underside of tray 666 which transfers the heat to brine 670 contained therein; it also gives up heat to brine 670 in basin 603 and picks up moisture en route to perforations 654 in lintel-conduit 651 which conducts the air back to the blower for recirculation. The moisture-laden air en route to the lintel-conduit passes along the underside of cover 602 which is cooled by radiation to the night sky and vapors condense on said cover and are collected in the same manner as during daytime operation.

In another embodiment of this invention, illustrated in FIGURE 5, movable thermal barriers 703a and 703b confine brine 770 and are respectively supported above and below stationary brine tray 766 on a frame 786 over impermeable base 760 which is protected by pads 764. The cover 702 of the still is shaped by weight 767 and lintel 761 which rests on the long lintel-supporting column 763 which also bears on impermeable base 760 protected by pads 764. The basins 703a and 703b are directly resting on an inclined portion 787 of frame 786 and are interconnected by drawlines 782 which on one side of said basins pass over idling pulleys 781 and on the other side of said basins pass over a driving means 783 which may be actuated by a reversible motor or crank (not shown).

By virtue of being mounted on inclined portion 787, a force applied by the driving means 783 can cause basin 703a to move up an incline to the position indicated by broken lines to the left of said basin while basin 703b moves in a downward direction to a position indicated by broken lines to the right of said basin. In this manner a counter-balancing of the two weights is obtained which is equally effective when the direction of the movement of basins 703a and 703b is reversed.

The frame 786 may be made of angular sections of corrosion-resistant metal, or of plastic or wood and inclined portion 787 may have fastened to it a grooved plastic trackway 728 shown in FIGURE 6 which engages a knife-edge runner 727 made of plastic fastened by a suitable adhesive to the bottom 785 of movable basin 703a containing brine 770. Cover 702, weight 767, lintel 761, lintel-supporting column 763, impermeable base 760, and pads 764 may all be of the same materials as described in respect to the embodiment illustrated by FIGURE 1. Instead of moving basins 703a and 703b on knife-edges, it is obvious that wheels, rollers, ball bearings or other means may be used to facilitate the positioning of the basins.

In the embodiment of FIGURE 5, it is apparent that only the bottom of brine basin 703b will be improved through being made of insulating material to prevent heat loss to underlying and nearby cold distillate 701 which acts as a reservoir-condensor in the manner described for the embodiment of FIGURE 1. In the present embodiment of FIGURE 5, both stationary brine tray 766 and upper movable basin 703a should preferably not have their bottoms insulated since this would interfere with efficiency during the nighttime multiple-effect distillation occurring when the brine basins are positioned as in FIGURE 5. It would also reduce daytime absorption of heat from vapors and hot air surrounding brine holders 766 and 703a when the still is operating with basins 703a and 703b in the daytime positions shown by the broken lines.

Thus the advantages of the present invention of movable thermal barriers result when said thermal barriers are constructed either of low heat capacity and low heat transfer materials, or when they comprise higher heat capacity and high heat storage materials as shown in 703a of FIGURE 5, or when both types of materials are combined into a thermal barrier means such as 703b of FIGURE 5.

It is also apparent that in the embodiment of FIGURE 5 there would be no interference with the operation of movable basins 703a and 703b, if the distillate reservoir 701 were to be completely drained or did not exist by virtue of removal of distillate from the still through distillate collecting troughs and conduits. The present still would then function in the nighttime position in a multiple-effect distillation process and the only loss would be the beneficial effect of having the distillate 701 serve as a reservoir-condenser. Thus at no time would this still have to be operated at the lower efficiency of the prior art.

In addition to the described means of FIGURE 5 for moving thermal barriers 703a and 703b on inclines 787 by drawlines 782 operating in conjunction with pulleys 781 and a driving means 783, it is obvious that one or more movable thermal barrier basins could be made to move horizontally over either basins of distilland or distillate. Those skilled in the art may also choose other means for moving the thermal barrier brine basins. For example, said basins may be freely suspended from cover-supporting lintels 761 of FIGURE 5 by cords, wires, chains, or the like and may then, while suspended, be swung by these cords, wires or chains to a new position and restrained in said new position by drawlines used for moving said thermal barrier basins.

As a further means of maintaining a "dry" cover on the still during hours of high solar radiation, stationary brine tray 766 of FIGURE 5, for example, and the movable thermal barrier brine trays 703a and 703b can contain within them a heat storage cell comprising confined chemical salts whose heat of solution or heat of fusion may be useful for heat storage. It is well known that crystalline materials having a large amount of water of crystallization absorb heat which causes the crystals to melt without a rise in temperature until melting is substantially complete. The heat so stored in this embodiment is released as the material recrystallizes during the nighttime when there is no solar radiation.

One or more of said brine basins, 766, 703a and 703b shown in FIGURE 5 should contain a heat storage cell substantially covering the bottom of the brine confining portion to any depth up to several inches, which contains hermetically sealed within said cell chemicals of the type of sodium thiosulfate with 5 molecules of water of hydration ($Na_2S_2O_3 \cdot 5H_2O$), disodium orthophosphate dodecahydrate ($Na_2HPO_4 \cdot 12H_2O$), sodium sulfate decahydrate (Glauber's salt, $Na_2SO_4 \cdot 10H_2O$), and the like. The basin or basins containing said cells may be drained of distilland 770 during all or part of the daytime period of solar radiation and in either case heat energy is stored in said cells. When solar radiation falls off, brine 770 is introduced into the basin or basins containing the cell and the accumulated heat in the cell will be given up to the brine causing it to distill during the nighttime when the said basins are in their position of multiple-effect distillation.

Clearly, the immediately foregoing embodiment is dependent for most beneficial action upon the movement of the thermal barrier brine basins to a position of multiple-effect distillation but it is not limited thereto. A chemical heat storage cell may be used for the distillation of brine without reference to any movable thermal barrier brine basin and without need for the extra internal reservoir-condenser 701. The use of the chemical heat storage cell is, however, preferable in combination with these other features of my invention but not limited thereto.

It has previously been proposed that such cells be used for heating water, but not in connection with the distillation of said water nor in connection with multiple-effect distillation processes nor in combination with movable thermal barriers of the type used in the present invention, nor in becoming itself a movable thermal barrier.

It has been earlier mentioned herein that the embodiment shown in FIGURE 5 does not require the presence of reservoir-condenser 701. It should be observed in such case that the melting point or softening point of a plastic impermeable base 760 should be higher than any temperature to be expected in a dry still. This could be especially important if chemical heat storage cells were used in brine basins without brine being also present therein in order to keep a dry cover during the hours of peak solar radiation.

An extra advantage is obtained from the low temperature of reservoir-condenser 601 when one uses a chemical heat storage cell 653 within floating brine basin 603 of FIGURE 8. Said cell may rest in major part within said basin over the insulated bottom but partially rest on the bottom thin skin portion 669 and thereby be substantially uninsulated from said reservoir. Thus the major portion of the chemical in the cell would absorb heat and melt during the daytime but that minor portion in near proximity to the cold reservoir would remain crystallized and these crystals would be effective as nucleation seeds for preventing the super-cooling of the chemical. A similar disposition of a portion of chemical heat storage cells 653a partly surrounding second conduit 655 is seen in FIGURE 9.

I may also preserve a portion of the chemical salt of heat storage cell 653 in solid state as a nucleating surface by using more of the salt than could conceivably be converted to the liquid state by the heat available during the day. Or, I could heavily insulate a portion on three sides so as to prevent heat entrance to this portion except by conduction through the chemical salt in either of its states and thereby maintain a part of the insulated portion in the solid state. The foregoing are alternatives to the methods of prior art in which refrigeration, forced movement of fluids or gases, and the use of unlike materials such as glass or borax are used to initiate nucleation. My means of providing a nucleating surface in a solar still is not limited to those having a reservoir condenser but applies wherever it is feasible to maintain a cold spot on a chemical heat storage cell by means of thermally contacting the cell with a high heat capacity substance maintained at a temperature below the fusion temperature of the chemical in said cell and especially when said high heat capacity substance is cooled by allowing it to radiate heat to the night sky.

Under other circumstances it is possible to use chemical heat storage cells comprising chemical salts of lower fusion temperature in such a manner as to provide additional condenser capacity. For example, such cells may contain an admixture of 10 to 25 percent common salt (NaCl) and 90 to 75 percent of Glauber's salt. In this case, said cells would give off heat at night and be able to absorb so much heat from vapors within the still during the day that water would condense on the surface of the cell. Such chemical cell-condensers could be disposed on movable thermal barriers or as movable thermal barriers so that they are exposed to heat radiation loss at night but during the daytime they are positioned under the stationary brine tray or under a movable thermal brine basin which is absorbing solar energy. Condensate then forming on said chemical-cell condenser would drip therefrom into the reservoir. The movable thermal barrier in this instance might comprise nothing more than the cell itself.

In another form, two chemical heat storage cells might be used within a solar still simultaneously wherein the first of said cells confines a chemical composition with a fusion temperature in the range of 40 to 80° F. while the second confines a chemical composition with a fusion temperature in the range of 80 to 150° F. and wherein both are so positionable that the first is shielded from the solar radiation but is exposed, except for the minor effect of the cover, to the night sky while the second is exposed to daytime solar radiation but is disposed to give up its heat during the nighttime in a manner to cause distillation of a distilland. Under these circumstances, the first would serve as a condenser during the day and the second would serve as a heat source during the night.

In another form, illustrated in FIGURE 9, the chemical heat storage cell 653a could be permanently positioned under one of the brine basins 666 and operate in the daytime as a condenser which takes up heat from the vapors and condensate while at night giving up the same heat to the nearby brine basins so as to increase the distillation therein. As previously disclosed, this embodiment may be used with forced recirculation of air and vapor within the still.

In another embodiment of this invention illustrated in FIGURE 7, movable thermal barrier means 803 is located outside of the enclosure made by condenser-cover 802 and the hight heat capacity portion of the enclosure 801. Thermal barrier 803 is made of hol low heat capacity, low heat transfer materials. In another form, surface 890 of thermal barrier 803 may be covered by or support reflective material such as aluminum foil, or it may be painted with aluminum or titanium dioxide pigmented paint or by any other means made to achieve high reflectivity for radiated heat. When so covered by foil or paint, the structural component of thermal barrier 803 need not be an insulating material but would operate effectively if made of metal, sheet plastic or other material suitable for supporting reflective surface 890.

In the embodiment of FIGURE 7, cover 802, cover-supporting lintel 861 and lintel-covering column 863 may be made of the same materials as their corresponding parts in the embodiment of FIGURE 1. The impermeable base 899 of the present embodiment is made of concrete formed into two basins for distilland. One is a shallow concrete basin 892 interconnected by means of conduit assembly 894, consisting of pipes and a valve, to deep basin 801 which corresponds to the high heat storage material of previous embodiments. On this instance, underlying and adjacent concrete base 899 acts in conjunction with distilland 870 to form the high heat capacity material 801. It is further obvious that in effect shallow basin 892 is an extension of this same high heat capacity portion 801, although in FIGURE 7 the shallow basin is not affected directly by the positioning of movable thermal barrier 803. An extension of the thermal barrier could be made to cover a large part of the shallow basin 892.

In FIGURE 7, left of the center cover-supporting column 863 (shown broken), the movable thermal barrier means 803 is in the daytime operating position. Here it is aligned at the same angle to the surface of brine 870 as the angle of incidence of solar radiation. As a result, it throws a shadow only on condensate collection trough 895 and this shadow serves the useful purpose of retarding redistillation of condensate 893 which, owing to its high sensible heat, has been observed to redistill when left unshaded in the prior art. In addition, reflective surface 890 of movable thermal barrier 803 reflects scattered atmospheric radiation into the still.

As the inclination of the sun varies seasonally, the angle of movable thermal barrier 803 is adjusted in relation to the surface of brine 870. The external means supporting thermal barrier 803 is of any suitable type (not shown) fitted with a suitable perforated, arc-shaped device 891 at each end of said thermal barrier and adapted to hold said thermal barrier in different positions by means of a pin 897 fitting through said perforations and into the body of thermal barrier 803. By this means the angle of inclination of thermal barrier 803 can be made to conform substantially with the angle of incidence of solar radiation.

In the embodiment of FIGURE 7, it will be observed that the rounded edge 898 of the thermal barrier 803 may bear on the cover 802 so as to cause it to assume the valley produced by means of weights 667 of the embodiment of FIGURE 1.

During the daytime, shallow basin 892 is substantially filled with brine 870 while deeper basin 801 is only partially filled with brine. Both of said basins absorb solar energy but brine 870 in shallower basin 892 heats more rapidly and starts distilling first. The brine 870 in deeper basin 801 rises in temperature more slowly because of its depth and greater volume and starts distilling later. After the sun has gone down, brine 870 in shallow basin 892 is the first to stop distilling and it cools rapidly by radiation loss of heat to the night sky. There is a point, therefore, when it would be desirable to drain brine 870 from shallower basin 892 through conduit assembly 894 into deeper basin 801 so as to conserve the residual heat both by virtue of the increased ratio of brine depth to radiating surface area in deeper basin 801 and, more importantly, by virtue of the prevention of radiation loss to the night sky when movable thermal barrier 803 is in its nighttime position.

In FIGURE 7, right of center cover-supporting column 863, shown broken, movable thermal barrier 803 is shown in its nighttime position close to cover 802 and effective over a substantial portion thereof. In this position it prevents radiation heat loss from deeper basin 801 to the night sky and thus greatly increases the efficiency of the distillation process. In this embodiment, all or a part of the portion of cover 802 over shallower basin 892 serves as a cover-condenser during the nighttime while all of cover 802 is a cover-condenser during the daytime.

It is obvious that the temperature differential between shallower basin 892 and deeper basin 801 will cause some condensation in deeper basin 801 in the daytime but this will serve to heat the brine in said deeper basin and cause it to distill more during the night hours thereby recovering the lost distillate. To the extent of nighttime condensation on the surface of the emptied shallower basin 892, there will be loss of heat and distillate; this may be minimized by extending the protective area of thermal barrier 803 and, in any event, this loss is small compared to that lost in the prior art. Furthermore, both basins 892 and 801 may be constructed of foamed plastic in which case nighttime condensation in the shallower basin would be minimal and heat loss to the ground would be greatly reduced.

Whereas in previous embodiments this invention maintained higher nighttime temperatures in a movable brine basin and cooled distillate in the bottom basin to night sky, the invention is equally applicable when the location of the distillate and distilland are reversed. FIGURE 10, in conjunction with FIGURE 11 an enlarged portion thereof, illustrates an embodiment in which movable insulated distillate basin 3 floats on and laterally moves over brine 7 confined by side walls 8 and bottom liner 5 the major portion of which rests on the ground. A rigid stationary brine tray 6 supported on side walls (not shown) is suspended across the width of the still. Brine 7 is introduced into said tray 6 through a conduit (not shown) in the side walls, overflows through conduit 9, falls into the bottom brine basin formed by bottom liner 5 and is discharged from the still through conduit 10 and by a valve and piping means (not shown). Distillate 1, which condenses on cover 2, is collected in peripheral troughs 4 or in collecting troughs 11 suspended from cover 2 in the manner shown in FIGURE 13 where said cover is seen to be forced into recess 12 and retained therein by spline 13. Distillate 1 collected in troughs 11 is conducted to the edge of the still where is discharges into peripheral trough 4 which connects with conduit 16, shaped as an inverted T, which is connected through flexible tubing 17 (shown only at connecting ends) to a distillate reservoir over movable distillate basin 3. Conduit 16 is also connected, outside of the still, to a piping and valve means (not shown) for removing distillate 1 from the solar still.

Cover 2 is suspended across the still by support 14 resting on columns 15 located beyond the edges of the still where said cover is fastened to the side walls. FIGURE 12 illustrates the means for suspending cover 2 in a manner comparable to suspending collecting troughs 11 with a recess 12 and spline 13.

Most materials of this embodiment have been previously disclosed. Conduits 9, 10 and 16 and tubing 17 may be of plastic (polyvinylchloride); trough 11 and support 14 may be of extruded acrylic resin and spline 13 may be of polypropylene or of rubber-like materials such as neoprene.

In this embodiment of FIGURE 10, the daytime position of movable distillate basin 3 is beneath the stationary brine tray 6 and extends slightly beyond the bottom edges 18 thereof by virtue of greater width. Brine 7 over bottom liner 5, which in this embodiment must resist actinic rays and high temperatures, is then exposed to solar radiation but distills somewhat slower than brine 7 in tray 6 owing to the necessity to also heat brine underlying basin 3 by conduction and convection.

At sunset basin 3 is positioned at a lower level between two stationary trays 6 where distillate 1, which entered it during the day through troughs 4, conduit 16 and tubing 17, is cooled to the night sky. Brine 7 in the basin made by bottom liner 5 then continues to distill at night and vapors condense on the sloping underside of tray 6 giving up latent heat thereto and causing further distillation of brine 7 therein. Condensate on underside of tray 6 drips from bottom edges 18 into the wider movable distillate basin 3 except at the end of the still shown in FIGURE 11 where a special collecting trough 19 is provided to collect distillate and to conduct it through tubing (not shown) to conduit 16.

In the morning brine 7 contained by liner 5 as well as that in tray 6 will be warm and will start distilling earlier than in stills of prior art. The cold distillate 1 can be then withdrawn from basin 3 through tubing 17 and conduit 16 or it may be left in basin 3 to serve as a condenser under tray 6. If it is not desired to cool distillate 1 or to use it as a condenser, movable thermal barrier 3 need not be formed as a basin but can be a flat sheet of insulating material in which case tubing 17 is not needed and special collecting troughs 19 are required at each bottom edge 18 of trays 6.

The means for positioning movable distillate basins 3 is best shown in FIGURE 11. A winding means 20 mounted exterior to the still is caused to wind up a drawline 21 which passes through cover sealing means 22 then around pulleys or rollers 23 and 24 mounted at the edges of the still, and is fastened to a tab 25 affixed to basin 3 before passing to a similar tab on the next of a plurality of movable basins 3 along the length of the still and then to another set of pulleys and winding means used to hold drawline 21 taut and to pull basins 3 toward that end of the still. Cover sealing means 22 is shown as a clamping device held to side wall 8 by bolts 26; the clamping device may be of plastic, rubber, or wood.

The internal condenser of this invention is capable of many adaptations to other components of the solar still. It has been found advantageous to operate the still at as high a temperature as possible and to have a relatively low temperature differential between brine and cover—especially when using forced recirculation of vapors. This makes it desirable not to specially cool the distillate condenser but rather to retain it as hot as possible both day and night. FIGURE 14 is a section along the diameter of a circular still in which distillate 101 is collected over bottom liner 105 and supports floating brine basin 103 under cover 102 which is sealed at side walls 108 by clamping device 122. Cover 102 is suspended at a central point by cover clamp 127 supported by wires 128 fastened to uprights 129 attached to the walls 108 of the still. FIGURES 16 and 17 are enlarged sections of this embodiment and best illustrate construction details and operation of the invention.

In FIGURES 16 and 17, floating basin 103 is formed from plastic with a "waffle" patterned upper surface, best shown in FIGURE 15, consisting of isolated raised portions and interconnected recessed portions formed by saw kerfs or when molding the plastic basin 103. Resting on the raised portions of the pattern is an impervious plastic film 130 which passes over the edges of basin 103 and is affixed to the sides thereof by a suitable adhesive to form a basin containing brine 107 above the pattern of tops on basin 103. Floating on brine 107 above film 130 is a black porous wick 131 consisting of polypropylene fibers formed into a non-woven felt which provides a large evaporation surface. Wick 131 is held secure by concrete bars 132 which keep wick 131 generally in contact with brine 107 when air is introduced between film 130 and wick 131.

In this embodiment, air is withdrawn from the still through conduit 133 of concentric duct system 134 to a blower 135 which returns air through conduit 136, a part of duct system 134, to a distributing head 137 located between film 130 and wick 131. From distributing head 137 the air enters conduits 138 which may be disposed radially or concentrically over the major portion of film 130 and from which air escapes through a plurality of passageways 139 in the form of fine bubbles rising through brine 107. The air then passes through porous wick 131.

During daytime operation, brine 107 absorbed by capillarity in floating wick 131 has a higher temperature than brine 107 underlying said wick and while there is a tendency for temperature equalization by conduction I prefer to deter this by accelerating evaporation in the hottest brine in wick 131 by passing air through said wick to remove hot vapors. In this manner, wick 131 acts as an internal evaporative cooler for underlying brine 107 and a substantial temperature differential is maintained between the evaporating brine on the upper surface of wick 131 and brine contacting the lower surface thereof and which I now use as an internal condenser.

The air and vapors leaving the upper surface of wick 131 are forced by pressure from blower 135 to pass under cover 102 to the periphery of floating basin 103 whereupon a portion of the vapors condense on cover 102, condensate flows down to circumferential distillate collecting trough 104 from which it passes into conduit 140 shaped as an inverted T and existing in side wall 108. While the distillate may be withdrawn through opening 141 by a piping and valve means (not shown), I prefer to have it pass through flexible tubing (not shown) which connects opening 142 with conduit 143 in the bottom of basin 103 said conduit ending in one of the interconnecting recesses in the patterned upper surface of basin 103 which is provided with passageways 144 at a level intermediate between the bottom of the recesses and the tops of the patterned upper surface of basin 103 which support film 130. The hot distillate condensed on cover 102 partially fills the space between film 130 and the bottom of the recesses in basin 103; should the amount of distillate 101 become excessive, it overflows through passageways 144 and joins distillate 101 over bottom liner 105 upon which basin 103 floats. In practice, distillate retained in the recesses of basin 103 is at a higher temperature than the distillate upon which said basin floats even though there is no attempt to cool distillate in either of the two distillate reservoirs.

The air and the vapors which did not condense on cover 102 pass through the annular space 145 between basin 103 and still wall 108, enter passageways 144 and pass between the distillate reservoir in basin 103 and overlying film 130 en route to centrally disposed conduit 133 which is attached to the vacuum or low pressure side of blower 135. While passing under film 130 en route to conduit 133, the vapors are partially condensed on said film and give up latent heat to the overlying brine 107 thereby replacing in part the heat taken up by evaporation of brine 107 at the upper surface of wick 131. The hot condensate flows from film 130 and joins distillate originating from cover 102; a portion of the vapors may also condense on said distillate reservoir in the recesses of the patterned surface of basin 103.

At night, the brine at the upper surface of wick 131 is warmed from below by the sensible heat of brine 107 underlying wick 131 and by distillate 101 which may tend to reflux under film 130. Thus distillation is continued as long as temperature differentials are favorable.

In another embodiment, distillate 101 under film 130 is interconnected with distillate over bottom liner 105 by means of a plurality of conduits 143, or openings otherwise formed, and cover condensate is allowed to pass directly from opening 142 into the distillate reservoir confined by bottom liner 105. In this embodiment it is essential to balance the buoyancy of basin 103 with the weight thereon so that the level of distillate under film 130 will be similar to that shown in FIGURES 16 and 17. The thermal capacity of the entire distillate reservoir is then available through conductance and liquid convection to heat the underside of film 130 and so continue distillation throughout the night. As yet another foreseen modification, FIGURE 18 shows that forced air and vapor recirculation can be adapted to the patterned underside of a movable floating brine basin 203 of the type employed in FIGURES 1, 8 and 10 floating on distillate 201 which serves as a condenser for vapors passing through passageways 244 en route to a duct system which recirculates air and vapors in the manner of the embodiment of FIGURE 14.

While my preferred embodiment combines a number of novel components for a solar still such as my internal reservoir-condenser, my internally disposed chemical heat storage cell, my cover draped over cover supports and formed into a valley by a weighting means, and more particularly by my use of a thermal barrier means either internally or externally mounted, it must be specifically understood that it is not necessary to use all of these or any specific combination of them in a solar distillation process in order to improve upon the prior art. In fact, each one of them may be used separately or in different combinations in solar stills in a manner in which said separate or combined use is the only distinguishing feature from prior art and I claim these separate and combined novel means for improving upon the prior art as a part of my invention. Specifically, the flexible cover draped over cover supports and formed into at least one valley by a weighting means may cover and partially enclose nothing more than a brine basin of the prior art; and the movement of my draped cover over cover supports or the movement or shifting of my flexible cover in a manner to decrease deterioration thereof, with or without change of surface area of the cover, is to be regarded as an improvement upon the fixed cover usage in prior art. These features of my preferred embodiment are simultaneously disclosed and claimed because in different combinations they do provide the most efficient and low cost solar stills now known although under varying circumstances it may also be desirable to use all new features simultaneously. It is also to be noted that while I prefer to condense vapors within the distillation zone, my invention is not limited thereto. I may, in fact, have a condenser exterior of the enclosure confining the distillation zone to which I circulate vapors and from which I return distillate to the distillate reservoirs within said enclosure.

The manner of using my internal condenser is extremely varied. The internal condenser may be of distillate or of distilland when either is so disposed by means disclosed in this invention to maintain temperatures conducive to the evaporation, condensation and collection of distillate. For purposes of an internal condenser, I preferably retain within the still an amount of distillate or distilland at a favorable temperature greater than one day's yield of distillate. Though benefits are derived from smaller amounts, the latent heat given up by vapor condensation on too small a volume of reservoir-condenser would soon make small reservoirs ineffective as condensers and the volume of distillate within the still would hardly be adequate to support floating basins. Hence, I usually use a distillate reservoir of greater volume than one week's production of the still.

While the embodiments of the invention illustrated in the FIGURES 1 through 18 have been described with considerable particularity and other embodiments have also been generally referred to, it is expressly understood that the invention is not restricted thereto, as the essence of the disclosed invention is capable of receiving a variety of expressions which will readily suggest themselves to those skilled in the art. Obviously, changes may be made in the arrangement, proportion and composition of parts and certain features may be used with other features without departing from the spirit of this invention. I do not wish, therefore, to be limited to the precise details of construction set forth but desire to avail myself of all changes within the scope of the appended claims.

What is claimed is:

1. An apparatus for solar distillation comprising an enclosure having in combination: a cover of at least semi-transparent material capable of transmitting radiant energy, at least one stationary distilland basin having bottom and side walls for confining distilland arranged in said enclosure and beneath said cover, a distillate reservoir disposed above the distilland basin, means for supporting said cover, means for sealing said enclosure, means for feeding distilland into at least one distilland basin, means for removing concentrated distilland, means for removing distillate, and means to move said distillate reservoir laterally with respect to the distilland basin and means to move said distillate reservoir.

2. An apparatus for solar distillation comprising an enclosure that contains both a distilland reservoir and a distillation zone, means for introducing distilland, means for removing distillate and means for removing concentrated distilland, said enclosure having a flexible cover of at least semi-transparent material capable of transmitting solar radiation supported along at least two horizontal locations, said cover being provided with at least one elongated weighting means disposed between the supports and from which weighting means said cover material diverges upwardly to the cover supporting means.

3. An apparatus according to claim 2 wherein said weighting means comprises a condensate collecting trough internally suspended from said cover.

4. An enclosure according to claim 2 wherein said condensate collecting trough is suspended from said cover by an externally located spline that engages a recessed portion of said condensate collecting trough serving as a weighting means.

5. An enclosure according to claim 2 wherein adjustment means are provided for varying the angle at which portions of said cover diverge upwardly from said weighting means.

6. An enclosure according to claim 5 wherein said adjustment means comprises a take-up means attached to a portion of said cover, which take-up means can be actuated to vary the total area of the cover material over said enclosure.

7. An apparatus for solar distillation comprising an enclosure that contains at least one distilland reservoir and at least one distillation zone, means for introducing distilland, means for removing distillate, and means for removing concentrated distilland, said enclosure having a supported cover of at least semi-transparent material capable of transmitting solar radiation, said distillation zone constituting a tray displaceable underneath said distilland reservoir, and said distillation zone having at least one chemical heat storage cell on the bottom thereof.

8. An apparatus for distillation comprising in combination:
(a) a distillate reservoir having bottom and side walls,
(b) a cover of at least semi-transparent material capable of transmitting radiant energy, said cover being disposed above and across substantially the entire area of said distillate reservoir,
(c) a plurality of distilland basins located at different levels between said distillate reservoir and said cover, at least one of said distilland basins located at one level being laterally movable with respect to at least one other distilland basin located at another level, at least one distilland basin disposed in a generally horizontal plane above the bottom of the distillate reservoir and below said cover, and
(d) support means for supporting said cover above both said distilland basin and distillate reservoir.

9. An apparatus for solar distillation comprising an enclosure having in combination: a distillate reservoir having bottom and side walls, a cover of at least semi-transparent material capable of transmitting radiant energy, said cover being disposed above and across substantially the entire area of said distillate reservoir, means for supporting said cover, means for feeding distilland, means for removing concentrated distilland, means for removing distillate, disposed in a generally horizontal plane above the bottom of the distillate reservoir and below said cover and a plurality of distilland basins located at different levels under said cover, at least one of said distilland basins being laterally movable with respect to at least one other distilland basin located at another level, and wherein at least one distilland basin is adapted to float on the distillate reservoir.

10. An apparatus for solar distillation comprising an enclosure having in combination:
(a) a main distilland basin,
(b) at least one other distilland basin adjacent to said main distilland basin,
(c) means for draining at least one of said other distilland basins into said main distilland basin,
(d) a condensate collecting trough adjacent at least one of said distilland basins,
(e) a cover of material capable of transmitting radiant energy disposed above and across the entire area of said distilland basins and said condensate collecting trough,
(f) support means for supporting said cover above both said distilland basins and above said condensate trough,
(g) a thermal barrier means comprising an elongated weighting means which is mounted exterior of said cover and movable in contact therewith,
(h) said thermal barrier weighting means being substantially co-extensive in area with at least said main distilland basin,
(i) means for moving said thermal barrier weighting means from a first position near to and substantially parallel to a portion of said cover to a second position at a substantial angle to said portion of said cover.

11. In the method of solar distillation involving an enclosed distillation zone under a cover trinsmitting solar radiation to distilland in at least one distillation zone in which method distilland is evaporated, vapors are condensed on a condensing surface and distillate is collected, the improvement which comprises:
(a) condensing vapors on a distillate reservoir serving as a condensing surface, and
(b) maintaining said distillate reservoir at a temperature below that of said vapors by (c) moving a thermal barrier between a first and a second position, said first position being selected upon occurance of solar radiation and being so located as to interpose said barrier between solar radiation and said distillate reservoir to prevent absorption of solar radiation by said distillate reservoir, and said second position being selected under night sky conditions and being so located as to expose within said distillation zone at least a major portion of said distillate reservoir to the night sky so as to cool said distillate reservoir.

12. In the method of solar distillation involving an enclosed distillation zone under a cover transmitting solar radiation from the sky to a body of distilland under said cover in which method distilland is evaporated, vapors are condensed on a condensing surface and distillate is collected, the improvement which comprises:
(a) confining a first body of distilland to a restricted area in said distillation zone and heating said first body by solar radiation to induce distillation,
(b) concurrently confining a second body of distilland to a second restricted area in said distillation zone and heating said second body by solar radiation to induce distillation,
(c) moving said first body of distilland to a position below said second body of distilland after a portion of the distillation cycle has been completed,
(d) continuing said distillation and radiating heat to the sky from said second body until the temperature of the distilland comprising said second body is lowered to the condensing temperature of vapors distilled from said first body, thereby
(e) causing vapors from said first body to condense on the under surface of said confined second body to warm said second body so as to continue distillation from said second body, thus producing multiple effect distillation.

13. In the method of solar distillation involving an enclosed distillation zone under a cover transmitting solar radiation to distilland in at least one distillation zone, in which method distilland is evaporated, vapors are condensed on a condensing surface, and distillate is collected, the improvement which comprises:
(a) locating a fusible crystalline heat storage chemical in a first position spaced from said distilland during a period of intense solar radiation to liquify by solar radiation at least a portion of said chemical and to store latent heat in said chemical, and
(b) subsequently moving said liquefied chemical to a second position closer to said distilland to release a portion of said latent heat to said distilland during a period of less intense solar radiation, whereby the distillation of distilland is brought about during said period of less intense solar radiation.

14. In the method of claim 13, the improvement which comprises:
(a) heating and liquefying a first portion only of said heat storage chemical,
(b) cooling and maintaining in a crystalline state a second portion of said heat storage chemical by inducing thermal transfer to a coolant,
(c) contacting said first portion of said chemical with said second portion to nucleate said first portion, and
(d) maintaining said coolant at a temperature below the fusion temperature of said chemical.

References Cited by the Examiner
UNITED STATES PATENTS 3,383,234　8/1945　Barnes ------------ 202—234
2,412,466　12/1946　Miller ------------ 202—234

(Other references on following page)

UNITED STATES PATENTS

| | | | |
|---|---|---|---|
| 2,445,350 | 7/1948 | Ginnings | 202—172 |
| 2,490,659 | 12/1949 | Snyder | 202—205 |
| 2,677,367 | 5/1954 | Telkes | 126—263 |
| 2,807,912 | 10/1957 | Bjorksten. | |
| 3,006,818 | 10/1961 | Lappala et al. | 202—234 |
| 3,015,613 | 1/1962 | Edmondson | 203—10 |
| 3,072,920 | 1/1963 | Yellott. | |
| 3,076,096 | 1/1963 | Bachmann. | |

FOREIGN PATENTS

| | | |
|---|---|---|
| 164,679 | 8/1955 | Australia. |
| 28,130 | 1907 | Great Britain. |

OTHER REFERENCES

Publication Saline Water Conversion Symposium Proceedings (1958) pp. 157–162.

NORMAN YUDKOFF, *Primary Examiner.*

F. E. DRUMMOND, *Assistant Examiner.*